Feb. 11, 1969 R. F. WOOD 3,427,496
HIGH VOLTAGE AND WIDTH STABILIZATION
Filed July 1, 1965
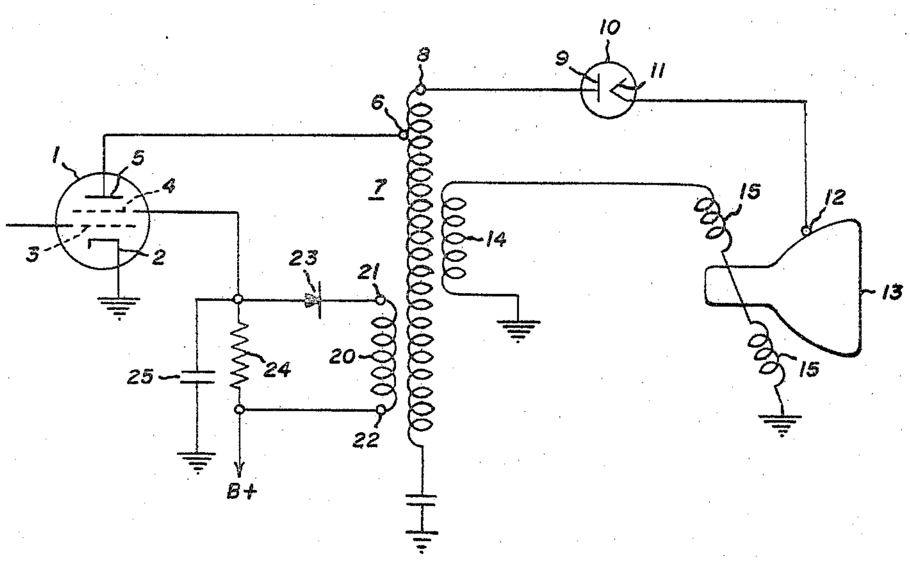
INVENTOR:
ROBERT F. WOOD,
BY William S. Wolfe
HIS ATTORNEY.

United States Patent Office 3,427,496
Patented Feb. 11, 1969

3,427,496

HIGH VOLTAGE AND WIDTH STABILIZATION

Robert F. Wood, Baldwinsville, N.Y., assignor to General Electric Company, a corporation of New York Filed July 1, 1965, Ser. No. 468,730
U.S. Cl. 315—27 3 Claims
Int. Cl. H01j 29/70

ABSTRACT OF THE DISCLOSURE

To compensate in a television receiver for variations in both the output of a horizontal driver tube and in the picture width of a cathode ray tube with changes in the beam current of a cathode ray tube, a diode and resistor are connected across a secondary winding of a horizontal output transformer. The resistor connects a B+ voltage supply to a screen grid of the horizontal driver tube. Output pulses from the horizontal driver tube are fed back by the secondary winding to determine the conduction state of the diode and thus the bias voltage supplied by the resistor to the screen grid.

This invention relates to horizontal and high voltage circuits in a cathode ray tube scanning system and in particular to the scanning circuits of a television receiver.

In all television receivers, monochrome or color, an increase in the beam current of the picture tube is caused by either an increase in the brightness level or by highlighted areas in the image. This increase in beam current loads down the high voltage supply which is typically coupled to the horizontal output transformer. Since the horizontal deflecting circuits are also coupled to the horizontal output transformer, loading of the high voltage reflects a loading effect to the horizontal deflecting circuits which may cause the picture size to vary and become distorted. Specifically the most typical effect on the image size due to an increase in the brightness level is to decrease the image width. Additionally, the variations in loading on the high voltage supply caused by variations in beam current will tend to cause variations in the output current of the horizontal driver tube since it is this output that supplies the horizontal output transformer.

Therefore, it is desirable that some means be devised to compensate for both variations in picture size and in the output of the horizontal driver tube with changes in the beam current. One approach developed to accomplish this result is some form of regulating device coupled to the horizontal driver tube to stabilize its output notwithstanding variations in loading on the horizontal output transformer. This solution has been found to be quite expensive due to the necessity of many additional components in the receiver. Another approach that has been developed is to adjust the bias on one of the control electrodes of the horizontal driver tube in a manner inversely proportional to the loading on the horizontal transformer such that the output current of the driver tube remains stable. While this latter approach has been found to be generally acceptable, the prior systems utilizing this approach have all necessitated additional and expensive equipment to derive a control voltage proportional to variations in loading and to present this control voltage to a control electrode of the horizontal driver tube.

It is therefore an object of this invention to provide a means for stabilizing the high voltage and picture width in a television receiver utilizing a minimum of additional components.

It is another object of this invention to provide a circuit which alleviates the deleterious effects of changes in beam current by stabilizing the output of the horizontal driver tube.

These objects are attained in one embodiment of the invention through use of a circuit in which the pulses in the horizontal output transformer are fed back to the control circuit of the horizontal driver tube in order to maintain the power output of the driver tube at a stable level. Due to the stabilization of the driver tube output and also the loading effect of the feedback circuit itself, the amplitude of the transformer pulses is stabilized. Since the horizontal deflecting coils are driven by pulses in the horizontal output transformer, the stabilizing effect on the amplitude of these pulses provides stability in the picture width.

The subject matter which is regarded as my invention is particularly pointed out and distinctly claimed in the appended claims. My invention, however, both as to its organization and method of operation, together with further objects and advantages thereof, may best be understood with reference to the following description taken in conjunction with the accompanying drawing in which:

The sole figure shows a circuit diagram of a portion of the horizontal circuits of a television receiver incorporating the present invention.

Referring to the figure there is shown a horizontal output tube 1 including a grounded cathode 2, a control grid 3 which is normally connected to the output of a horizontal oscillator not shown, a screen grid 4, and an anode electrode 5. The anode 5 is connected to a terminal 6 on the primary winding 7 of a horizontal output transformer. One end of the transformer primary 7, indicated by terminal 8, is connected to the anode electrode 9 of a high voltage rectifier 10 which is, in turn, connected at its cathode 11 to the second anode 12 of a cathode ray tube 13. Normally the high voltage rectifier 10 is supplied filament voltage for its cathode through a small winding wound on the same core of the transformer as primary winding 7; however, since this connection forms no part of the present invention it is omitted for the sake of clarity. Also wound on the same core of the transformer as the primary winding 7 is a secondary winding 14, the ends of which are respectively connected to ground and to the horizontal deflecting coils 15 of the cathode ray tube 13.

A blanking winding 20 is coupled to the primary winding 7 of the horizontal output transformer and is wound in such a manner that positive pulses occurring in the primary winding induce negative pulses at terminal 21 with respect to terminal 22 of the blanking winding 20. As will be understood by those skilled in the art the normal function of the blanking winding is to supply blanking pulses to the video amplifiers or cathode ray tube during the re-trace portions of the cathode ray tube scan. Therefore it should be understood that in a standard television receiver there are other connections and couplings to the blanking winding 20 which, again for the sake of clarity, are not shown in the drawing. In accordance with the present invention there is connected in series with the blanking winding 20 a diode 23, the series combination of the diode 23 and the blanking winding 20 being connected in parallel with a screen grid bias resistor 24. The resistor 24 is connected in series between the screen grid 4 and a source of B+ supply voltage. The diode 23 is poled in such a direction that the negative pulses induced in the winding 20 tend to overcome the back bias impressed on the diode due to the voltage drop across the resistor 24. The circuit values are preferably chosen so that during normal operation or average brightness level, the amplitude of the negative pulses in winding 20 is just sufficient to overcome the back bias on the diode 23. Finally a capacitor 25 is connected between ground and the junction of the resistor 24 and diode 23.

In the operation of the circuit of the figure, an increase in beam current tends to load the high voltage derived through the rectifier 10 from the primary winding 7 at the terminal 8. This loading effect is reflected into the transformer winding 7 which tends to decrease the amplitude of the pulses supplied to the winding 7 from the output of the horizontal driver tube 1. This decrease in the amplitude of the pulses in the winding 7 induces a corresponding decrease in the negative pulses in the blanking winding 20. Since it is the amplitude of these negative pulses in the blanking winding 20 which determines the extent to which the resistor 24 back biases the diode 23, it follows that the amount of conduction of the diode 23 is proportional to the amplitude of the pulses in the blanking winding 20. The capacitor 25 provides a conduction path to ground for the pulses induced in the blanking winding 20. It can be seen then that a decrease in the amplitude of the pulses will tend to decrease the conduction of the diode 23 thereby decreasing the total voltage impressed across the resistor 24. Since the resistor 24 supplies the bias voltage to the screen grid 4 of the output tube 1, a decrease in voltage across the resistor 24 effectively increases the screen voltage which, in turn, increases the output current of the driver tube 1. This increase in output increases the amplitude of the pulses in the transformer primary 7 and therefore tends to stabilize the high voltage output of the rectifier 10.

In addition to the compensating effect on the output of the horizontal driver tube, the diode tends to stabilize the amplitude of the pulses in the transformer 7 in another way. As the pulse amplitude decreases due to increased loading of the high voltage, the diode 23 begins to conduct less heavily as seen before. This decrease in conduction tends to lessen the loading effect the diode has on the blanking winding 20, which effect is reflected back into the primary winding of the transformer primary 7. Thus as the pulse amplitude in the winding 7 decreases, the loading of the pulses due to the blanking winding circuit also decreases thereby tending to increase the pulse amplitude and give a stabilizing effect.

As the beam current requirements decrease the loading of the high voltage also decreases which tends to increase the amplitude of the pulses supplied to the transformer primary 7 by the horizontal output tube 1. In a corresponding manner to that previously described, this increase in pulse amplitude tends to increase the conduction of the diode 23 which, in turn, increases the voltage across the resistor 24 supplied to the screen grid 4. A decrease in the screen grid voltage decreases the output of the driver tube 1 and therefore tends to stabilize the amplitude of the pulses supplied to the transformer primary 7. Also, the increase in conduction of the diode 23 caused by an increase in the pulse amplitude tends to increase the loading effect on the pulses due to the blanking winding circuit thereby tending to decrease the pulse amplitude and yield a stabilizing effect.

Since the width of the image in the cathode ray tube 13 is determined by the amplitude of the pulses supplied to the horizontal deflecting windings 15, and since the pulses supplied to these deflecting windings are supplied from the winding 14 wound on the same core as the primary winding 7 of the horizontal output transformer, it follows that the width of the image is stabilized to the same degree that the pulse amplitude in the transformer winding 7 is stabilized.

Although this invention has been described in terms of a negative pulse taken from the blanking winding 20, it should be understood that any pulse may be utilized just so long as its amplitude is characteristic of the pulse amplitude in the transformer primary winding 7. Thus in some applications a secondary winding other than the blanking winding may be utilized. Naturally if the pulses induced in some other winding are positive rather than negative, due regard to the polarities in the screen grid biasing circuit must be given. The circuit of the figure may easily be altered for positive pulses by reversing the polarity of the diode 23 and by switching the connections to the secondary winding 20.

Although the circuit and method of operation has been described in a preferred embodiment, it should be understood that various modifications and other arrangements will be obviously to those skilled in the art. Thus it is not intended that applicant be limited to the embodiment described but rather should be entitled to the full scope of the appended claims.

What I claim as new and desire to secure by Letters Patent of the United States is:

1. A high voltage and image width stabilizing circuit comprising:
   (a) a high voltage supply and horizontal output transformer including a primary winding and at least one secondary winding,
   (b) driving means for supplying pulses to said primary winding and thus to said secondary winding, said driving means including an output electrode and at least one control electrode,
   (c) a source of bias voltage,
   (d) a resistor connecting said source to said control electrode,
   (e) a diode connected in series with said secondary winding, the series combination being connected across said resistor, whereby changes in amplitude of the pulses induced in said secondary winding cause the impedance of said diode to change a proportional amount to thereby change the bias voltage across said resistor a likewise proportional amount.

2. A high voltage and image width stabilizing circuit comprising:
   (a) a high voltage supply and horizontal output transformer including a primary winding and at least one secondary winding,
   (b) driving means for supplying pulses to said primary winding and thus to said secondary winding, said driving means including an output electrode and at least one control electrode,
   (c) a source of bias voltage,
   (d) a resistor connecting said source to said control electrode,
   (e) a diode connected in series with said secondary winding, the series combination being connected across said resistor, said diode being poled such that the voltage across said resistor tends to back bias said diode, said diode further being connected to said secondary winding such that the pulses induced in said secondary winding from said primary winding tend to forward bias said diode,
   (f) a capacitor connected between ground and the end of said secondary winding connected to said diode, whereby an increase in pulse amplitude in said secondary winding causes an increase in the conduction of said diode thereby decreasing the bias voltage and therefore the output pulse amplitude of said driving means.

3. The circuit as described in claim 2 wherein said secondary winding comprises a horizontal blanking winding of said transformer.

References Cited

UNITED STATES PATENTS 2,956,235 10/1960 Fischman.

RODNEY D. BENNETT, *Primary Examiner.*

CHARLES L. WHITHAM, *Assistant Examiner.*